(12) United States Patent
Xia et al.

(10) Patent No.: US 10,223,193 B2
(45) Date of Patent: *Mar. 5, 2019

(54) PROACTIVE FAILURE HANDLING IN DATA PROCESSING SYSTEMS

(71) Applicant: MICROSOFT TECHNOLOGY LICENSING, LLC, Redmond, WA (US)

(72) Inventors: Hao Xia, Kirkland, WA (US); Todd F. Pfleiger, Seattle, WA (US); Mark C. Benvenuto, Seattle, WA (US); Ajay Kalhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

This patent is subject to a terminal disclaimer.

(21) Appl. No.: 15/392,387

(22) Filed: Dec. 28, 2016

(65) Prior Publication Data

US 2017/0109225 A1   Apr. 20, 2017

Related U.S. Application Data

(63) Continuation of application No. 15/088,377, filed on Apr. 1, 2016, now Pat. No. 9,594,620, which is a
(Continued)

(51) Int. Cl.
G06F 11/00 (2006.01)
G06F 11/07 (2006.01)
(Continued)

(52) U.S. Cl.
CPC .......... *G06F 11/079* (2013.01); *G06F 11/004* (2013.01); *G06F 11/076* (2013.01);
(Continued)

(58) Field of Classification Search
CPC .... G06F 11/0751; G06F 11/079; G06F 11/16; G06F 11/14; G06F 11/22; G06F 2201/865
See application file for complete search history.

(56) References Cited

U.S. PATENT DOCUMENTS 6,108,699 A * 8/2000 Moiin ................. G06F 11/1425
709/201
6,952,734 B1   10/2005 Gunlock et al.
(Continued)

OTHER PUBLICATIONS

Han "Experimental Evaluation of Behavior-Based Failure-Detection Schemes in Real-Time Communication Networks", Jun. 1999, IEEE, vol. 10, No. 6, pp. 1-14.
(Continued)

*Primary Examiner* — Bryce P Bonzo
*Assistant Examiner* — Jeison C Arcos
(74) *Attorney, Agent, or Firm* — Workman Nydegger

(57) ABSTRACT

Embodiments are directed to predicting the health of a computer node using health report data and to proactively handling failures in computer network nodes. In an embodiment, a computer system monitors various health indicators for multiple nodes in a computer network. The computer system accesses stored health indicators that provide a health history for the computer network nodes. The computer system then generates a health status based on the monitored health indicators and the health history. The generated health status indicates the likelihood that the node will be healthy within a specified future time period. The computer system then leverages the generated health status to handle current or predicted failures. The computer system also presents the generated health status to a user or other entity.

29 Claims, 4 Drawing Sheets

Related U.S. Application Data continuation of application No. 14/537,130, filed on Nov. 10, 2014, now Pat. No. 9,323,636, which is a continuation of application No. 13/079,750, filed on Apr. 4, 2011, now Pat. No. 8,887,006.

(51) Int. Cl.
| | | |
|---|---|---|
| *G06F 11/30* | (2006.01) | |
| *G06F 11/32* | (2006.01) | |
| *H04L 12/26* | (2006.01) | |
| *G06F 11/22* | (2006.01) | |

(52) U.S. Cl.
CPC ...... *G06F 11/0709* (2013.01); *G06F 11/0751* (2013.01); *G06F 11/0769* (2013.01); *G06F 11/0787* (2013.01); *G06F 11/2257* (2013.01); *G06F 11/3006* (2013.01); *G06F 11/3055* (2013.01); *G06F 11/3065* (2013.01); *G06F 11/324* (2013.01); *H04L 43/065* (2013.01); *G06F 2201/865* (2013.01)

(56) References Cited

U.S. PATENT DOCUMENTS

| | | | | |
|---|---|---|---|---|
| 6,986,076 | B1 | 1/2006 | Smith et al. | |
| 7,480,816 | B1* | 1/2009 | Mortazavi | G06F 11/1482 714/10 |
| 7,685,358 | B1* | 3/2010 | Larson | G06F 11/2023 709/216 |
| 7,886,182 | B1* | 2/2011 | Coatney | G06F 11/2028 714/11 |
| 8,887,006 | B2 | 11/2014 | Xia et al. | |
| 9,323,636 | B2 | 4/2016 | Xia et al. | |
| 10,048,996 | B1* | 8/2018 | Bell | G06F 11/079 |
| 2002/0049845 | A1* | 4/2002 | Sreenivasan | H04L 69/40 709/226 |
| 2002/0059417 | A1* | 5/2002 | Davis | H04L 41/0663 709/224 |
| 2003/0216888 | A1* | 11/2003 | Ridolfo | G05B 23/0283 702/181 |
| 2005/0114174 | A1* | 5/2005 | Raden | G06Q 50/22 705/2 |
| 2006/0064481 | A1* | 3/2006 | Baron | H04L 41/0886 709/224 |
| 2007/0067678 | A1 | 3/2007 | Hosek | |
| 2007/0086350 | A1* | 4/2007 | Haberkorn | H04L 69/16 370/242 |
| 2007/0195692 | A1* | 8/2007 | Hagglund | G06F 11/2058 370/216 |
| 2008/0141072 | A1* | 6/2008 | Kalgren | G01D 3/08 714/33 |
| 2008/0162983 | A1* | 7/2008 | Baba | G06F 11/0712 714/3 |
| 2009/0138141 | A1 | 5/2009 | Nwadiogbu et al. | |
| 2010/0238814 | A1 | 9/2010 | Chen et al. | |
| 2011/0055620 | A1* | 3/2011 | Sengupta | G06F 17/30011 714/2 |
| 2012/0151272 | A1* | 6/2012 | Behrendt | G06F 9/542 714/39 |
| 2012/0254669 | A1 | 10/2012 | Xia et al. | |
| 2016/0217025 | A1 | 7/2016 | Xia et al. | |

OTHER PUBLICATIONS

Poggemeyer, Liza., "System Center Operations Manager 2007 R2", In Operations User's Guide Microsoft Corporation, Sep. 2009, 232 Pages.

Litvinova, et al., "A Proactive Fault Tolerance Framework for High-performance Computing", In Proceedings of the 9th IASTED International Conference, vol. 676, Issue 024, Mar. 3, 2011, 6 Pages.

Short "4 Predictive Maintenance Technologies That Reduce Machine Downtime", Retrieved on Nov. 2, 2016.

Mickens, et al. "Exploiting Availability Prediction in Distributed Systems", USENIX Association, NSDI ' 06: 3rd Symposium on Networked Systems Design & Implementation, 2003, pp. 73-86.

"The Early Warning Project on Predictive Maintenance: Advance Warning and Problem Avoidance in Complex Industrial Processes", SAS Detecting and Predicting Early Warnings in Complex Industrial Processes, 2008, 22 pages.

Arnautovic "Gradual Transition Towards Self-Managed Software Systems Based on High-Level Communication Specification", A Thesis Submitted to the Faculty of Electrical Engineering in Partial Fulfillment of the Requirements for the Degree of Doctor of Technical Sciences, Feb. 2009, 106 pages.

Chakravorty et al. "Proactive Fault Tolerance in MPI Applications via Task Migration" In High Performance Computing—HiPC 2006, Mar. 3, 2011, 12 pages.

Charoenpornwattana et al. "A Neural Networks Approach for Intelligent Fault Protection in HPC Environments" In HAPCW'08: High Availability and Performance Computing Workshop, Apr. 3, 2008, 6 pages.

Engelmann et al. "Proactive Fault Tolerance Using Preemptive Migration" In Processing 17th Euromicro International Conference on Parallel, Distributed and Network-Based, Feb. 2009, 6 pages.

Fu, et al., "Exploring Event Correlation for Failure Prediction in Coalitions of Clusters", In Proceedings of the 2007 ACM/IEEE Conference on Supercomputing, Nov. 10, 2007, 12 Pages.

Hoffman, Bill., "Monitoring at your service", In ACM Magazine Queue Managing Megaservices, vol. 3, Issue 10, Dec. 2005, 10 Pages.

Hood, et al. "Intelligent Agents for Proactive Fault Detection", In IEEE Internet Computing, vol. 2, Issue 2, Mar. 1998, 8 Pages.

Hood, et al., "Proactive Network-Fault Detection", In IEEE Transactions on Reliability, vol. 46, Issue 3, Sep. 1997, pp. 333-341.

Huda, et al., "An Agent Oriented Proactive Fault-tolerant Framework for Grid Computing", In Proceedings of the First International Conference on e-Science and Grid Computing, Jul. 2005, 8 Pages.

Lin, et al., "MOON: MapReduce on Opportunistic eNvironments", In Proceedings of the 19th ACM International Symposium on High Performance Distributed Computing, Jun. 2010, 12 Pages.

Nagaraja, et al., "Using Fault Model Enforcement to Improve Availability", In Proceedings of the Second Workshop on Evaluating and Architecting System dependability, Oct. 2002, 10 Pages.

Sun, et al., "Towards a Fault-aware Computing Environment", In Proceedings of the High Availability and Performance Computing Workshop, Mar. 2008, 6 Pages.

Widder, et al."Identification of Suspicious, Unknown Event Patterns in an Event Cloud", In Proceedings of the 2007 Inaugural International Conference on Distributed Event-based Systems, Jun. 20, 2007, 7 Pages.

Notice of Allowance dated Sep. 13, 2016 issued in U.S. Appl. No. 15/088,377.

"Final Office Action Issued in U.S Appl. No. 13/079,750", Dated: Mar. 18, 2014, 9 Pages.

"Non-Final Office Action Issued in U.S Appl. No. 13/079,750", Dated: Oct. 16, 2013, 11 Pages.

"Notice of Allowance Issued in U.S Appl. No. 13/079,750", Dated: Jul. 31, 2014, 5 Pages.

"Non-Final Office Action Issued in U.S Appl. No. 14/537,130", Dated: May 21, 2015, 10 Pages.

"Notice of Allowance Issued in U.S Appl. No. 14/537,130", Dated: Dec. 22, 2015, 5 Pages.

"Notice of Allowance Issued in U.S. Appl. No. 15/088,377", Dated: Dec. 2, 2016, 8 Pages.

* cited by examiner

PROACTIVE FAILURE HANDLING IN DATA PROCESSING SYSTEMS

CROSS REFERENCE TO RELATED APPLICATIONS

This application is a continuation of and claims benefit of U.S. patent application Ser. No. 15/088,377 entitled "PROACTIVE FAILURE HANDLING IN DATABASE SERVICES", filed with the U.S. Patent and Trademark Office on Apr. 1, 2016, which is a continuation of and claims benefit of U.S. patent application Ser. No. 14/537,130 entitled "PROACTIVE FAILURE HANDLING IN NETWORK NODES", filed with the U.S. Patent and Trademark Office on Nov. 10, 2014, now U.S. Pat. No. 9,323,636, which is a continuation of and claims benefit of U.S. patent application Ser. No. 13/079,750 entitled "PROACTIVE FAILURE HANDLING IN DATABASE SERVICES", filed with the U.S. Patent and Trademark Office on Apr. 4, 2011, now U.S. Pat. No. 8,887,006, the specifications of which are incorporated herein by reference.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

A database service may run in a cluster environment and may be distributed over multiple different computer systems. A database service is often relied on by users and software programs alike to be available twenty-four hours a day, seven days a week. Accordingly, database managers often implement various measures to ensure that the database service is always (or nearly always) up and running. Each database hosted in a database service has multiple replicas on different nodes so that when failures occur on one node, a backup node is available to take its place. Many different hardware and software failures may occur in a database service. One cannot anticipate the entire gamut of failures and, hence, preparations for such failures are often inadequate.

BRIEF SUMMARY

Embodiments described herein are directed to predicting the health of a computer node using health report data and to predicting and proactively handling failures in a database service. In one embodiment, a computer system monitors various health indicators for multiple nodes in a database cluster. The computer system accesses stored health indicators that provide a health history for the nodes. The computer system then generates a health status based on the monitored health indicators and the health history. The generated health status indicates the likelihood that the node will be healthy within a specified future time period. The computer system also presents the predicted health status to a specified entity.

In another embodiment, a computer system monitors various health indicators for multiple nodes in a database cluster. The computer system accesses stored health indicators that provide a health history for the database cluster nodes. The computer system then generates a health status based on the monitored health indicators and the health history. The generated health status indicates the likelihood that the node will be healthy within a specified future time period. The computer system determines, for at least one of the monitored nodes, that the likelihood that node will be healthy is below a threshold level, and transfers data stored on that node to various other nodes in the database cluster.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
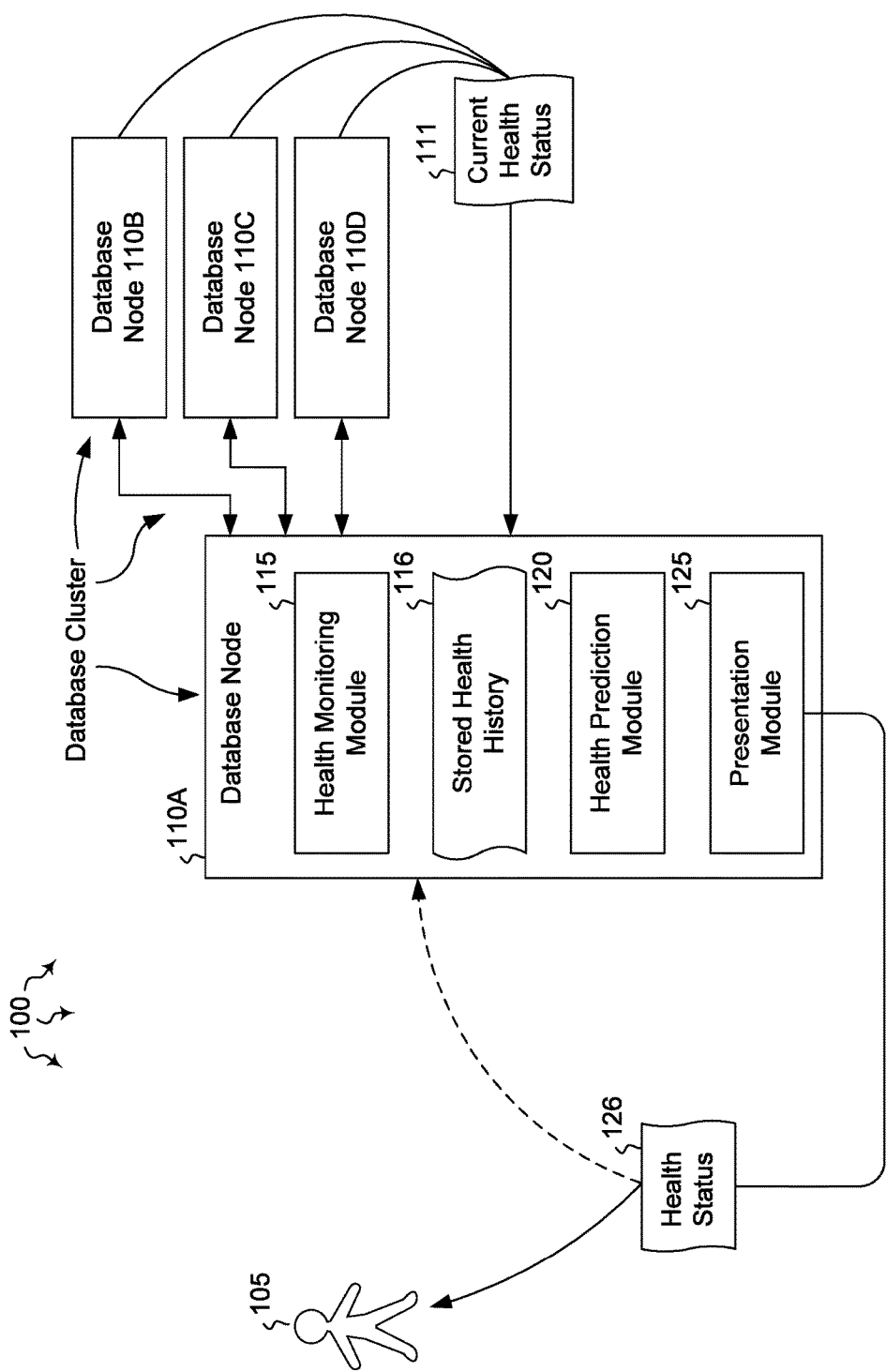
FIG. 1 illustrates a computer architecture in which embodiments of the present invention may operate including predicting the health of a computer node using health report data and presenting the predicted health status to a specified entity.

Embodiments described herein are directed to predicting the health of a computer node using health report data and to proactively handling predicted failures in database services. In one embodiment, a computer system monitors various health indicators for multiple nodes in a database cluster. The computer system accesses stored health indicators that provide a health history for the nodes in a database cluster. The computer system then generates a health status based on the monitored health indicators and the health history. The generated health status indicates the likelihood that the node will be healthy within a specified future time period. The computer system also presents the generated health status to a specified entity. The specified entity may be a user, a software program, another computer system or any other entity capable of receiving and/or viewing the health status. The user may be any type of computer system user including an end-user, an administrator, an information technology specialist, or any other human participant that can view or interact with a computer system.

In another embodiment, a computer system monitors various health indicators for multiple nodes in a database cluster. The computer system accesses stored health indicators that provide a health history for the database cluster nodes. The computer system then generates a health status based on the monitored health indicators and the health history. The generated health status indicates the likelihood that the node will be healthy within a specified future time period. The computer system determines, for at least one of the monitored nodes, that the likelihood that node will be healthy is below a threshold level, and transfers portions of data stored on the monitored node to various other nodes in the database cluster. It also prevents new data from being placed on the node which is predicted to fail.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state devices (SSDs) or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry data or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes a database cluster with multiple database nodes 110A-110D. The database cluster may be the backend of a distributed database service. Each database node may be configured to perform database functions and may operate in conjunction with the other nodes of the database cluster. While four nodes are shown in FIG. 1, it will be understood that substantially any number of nodes may be used in the database cluster.

Each node may include a health monitoring module 115 that performs health monitoring functions. For instance, the health monitoring module may monitor the current networking conditions, software failures, hardware failures, error messages indicating errors in software and/or hardware components, or any other indications of a computer node's health. Each node may report their current health status 111 to node 110A. Node 110A maintains a health history 116 of each node, by storing snapshots of their health status 111 in a persisted fashion. In some cases, the health monitoring module may be implemented as a part of the distributed service. In other cases, a cluster management service may be used with the cluster which automates provisioning, monitoring, and repairing tasks.

Database node 110A can use the other nodes' health statuses to predict or otherwise determine the nodes' future health. For example, if node 110B has been experiencing hardware or software failures (current failures or past failures as stored in health history 116), node 110A may be able to predict whether node will be healthy or unhealthy in the future. As used herein, a "failure" may refer to any transition from a healthy state to an unhealthy state. This takes into account both prior node state (e.g. stored health history 116) and current health status information collected by the cluster management service.

In some embodiments, the number of failures may be counted for each node in a recent, specified timeframe. If the number of failures exceeds a threshold amount, the node is predicted to be unstable or otherwise unhealthy for the near future. In some cases, an error level may be assigned to each failure that occurs, which encodes severity and nature of the failure. If a node is showing failures with an error level above a specified threshold, (for example, if the node is showing hardware failures), the node is also predicted to be unhealthy for the near future, without requiring the failure count to exceed the aforementioned threshold. If neither of the above applies to a node, it is predicted to be healthy. The nodes' health status may be continually re-evaluated, to optimize the accuracy of the node's predicted health status.

Node 110A may present the predicted health status 126 of each node to a specified entity 105. The predicted health status 126 may be leveraged by entity 105 in several ways. For example, the predicted health status may be used in forming a better view of the health status of the entire cluster. It may be used to distinguish between persistent and transient node failures. It may also be used to proactively prepare for node failures that may happen in the future. Further details will be enclosed in the descriptions of other embodiments of this invention where predicted node failures are proactively and automatically handled.

Figure 2:
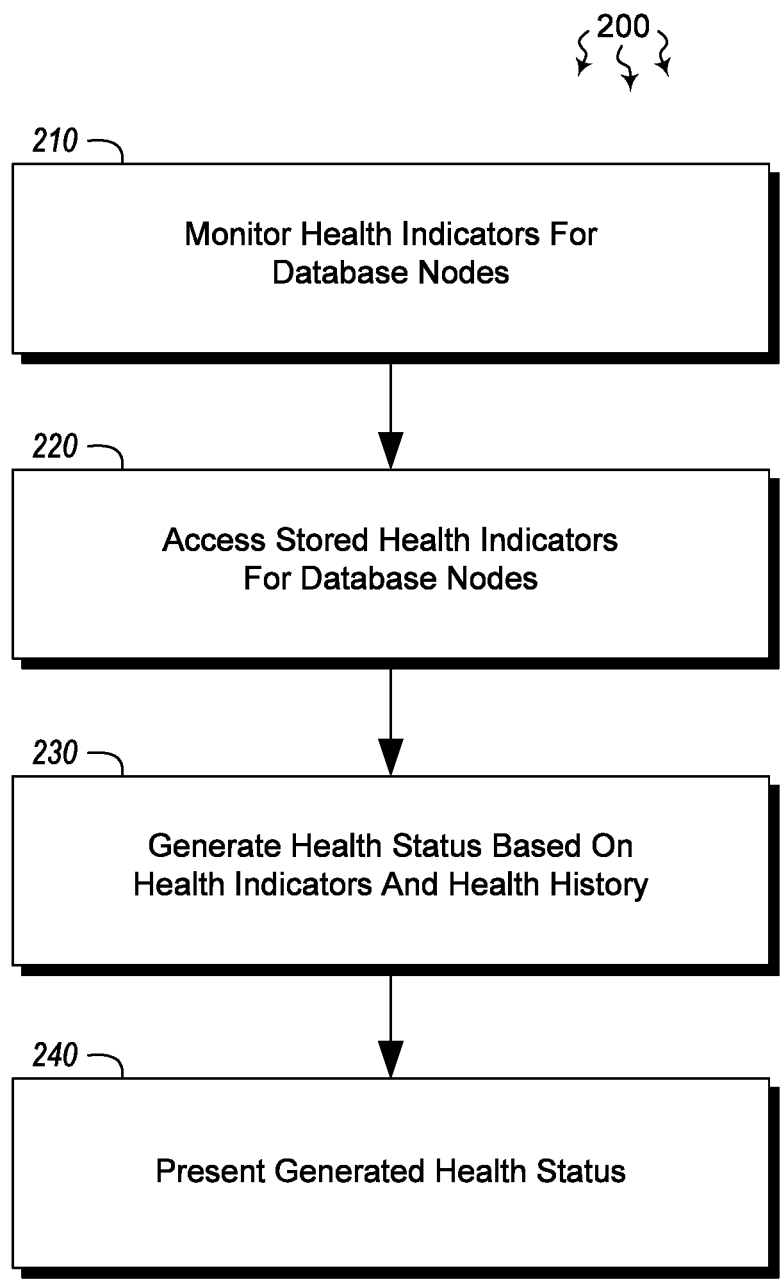
FIG. 2 illustrates a flowchart of an example method for predicting the health of a computer node using health report data.
Figure 3:
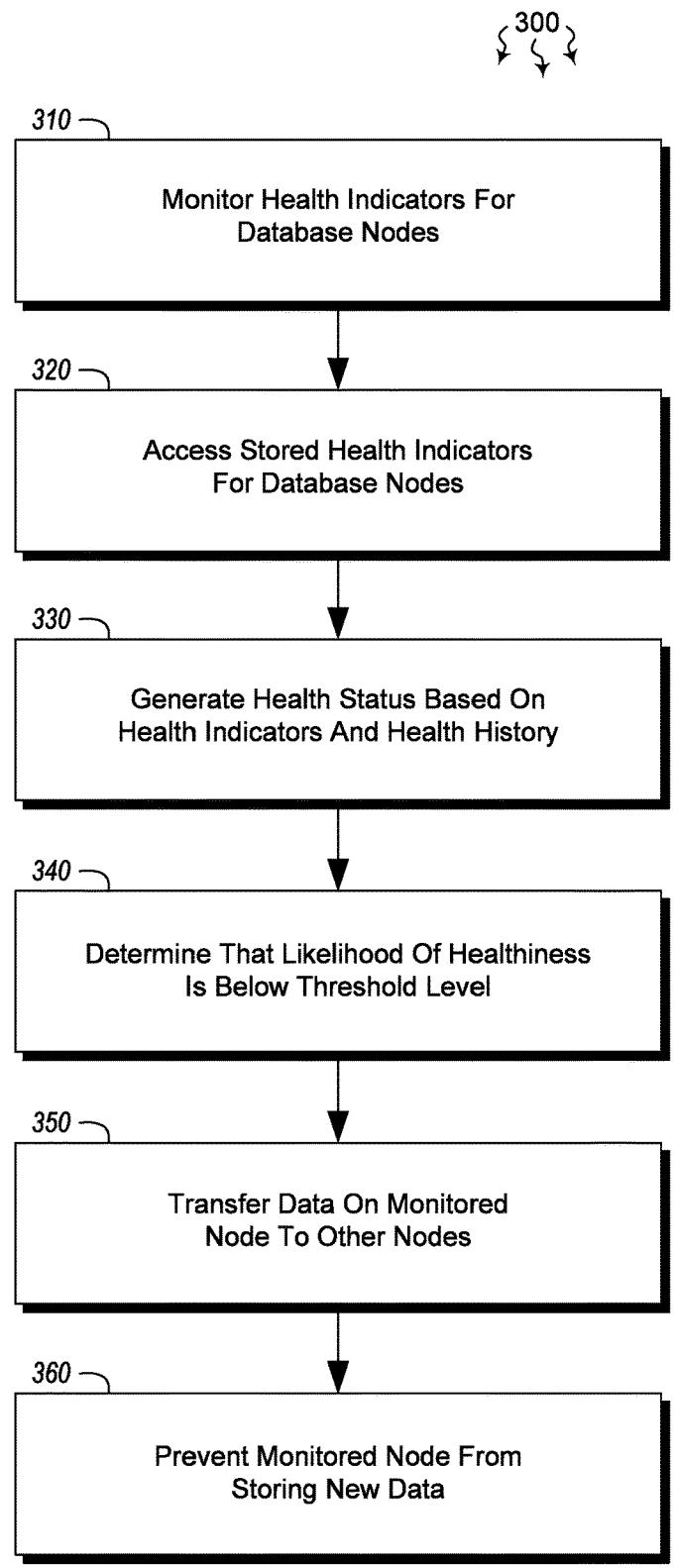
FIG. 3 illustrates a flowchart of an example method for proactively handling failures in database services.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for predicting the health of a computer node using health report data. The method 200 will now be described with frequent reference to the components and data of environment 100.

Method 200 includes an act of monitoring one or more health indicators for a plurality of nodes in a database cluster (act 210). For example, health monitoring module 115 may monitor various health indicators for database nodes 110A-110D. The health monitoring may include identifying and logging the occurrence of hardware errors, software errors, processing load or other indicators of a computer node's health.

Method 200 includes an act of accessing one or more stored health indicators that provide a health history for the database nodes (act 220). For example, the current health status sent by the database nodes may be stored over a period of time in health history 116. These stored health snapshots may represent a node's health over a period of time. For instance, the stored health history may show which hardware and software errors have occurred over a specified period of time. The health history may further show patterns such as an increasing or decreasing number of errors, which may indicate that the node is heading toward failure, or is showing signs of durability.

Method 200 includes an act of generating a predicted health status based on the monitored health indicators and the health history, wherein the predicted health status indicates the likelihood that the node will be healthy within a specified future time period (act 230). For example, the health prediction module may generate a health status report 126 based on the monitored health indicators 111 and on the stored health history. The health status report indicates the likelihood, for each monitored node, that the node will be healthy in the future. The report may thus be a prediction of how well the node will perform in the future. The prediction may be based on errors that have occurred in the past, or that are currently occurring. The prediction may be based on patterns of failures, severity of failures, types of failures, frequency of occurrence, average processing load, or other factors.

Method 200 includes an act of presenting the generated health status to a specified entity (act 240). For example, the health status 126 predicted by health prediction module 120 may be presented to entity 105 by presentation module 125. The presentation may illustrate which errors have occurred, when the errors occurred, what type of errors occurred, and so forth. The presentation may further show, for each node in the cluster, what the likelihood is that the node will keep functioning correctly in the near future. The user may then use the information in the presentation to proactively manage the nodes in the database cluster.

In some embodiments, the database cluster may proactively handle predicted node failures, in order to maintain high availability of the service, at least in some cases without much human intervention. In such embodiments, a blacklist may be devised. Members of the blacklist are nodes that may result in undesirable outcome if they continue or start to participate in functionality of the cluster. The health prediction mechanism described above may be used as a basis to maintain the membership of the blacklist. For a node that is not currently on the blacklist, if the predicted health 126 indicates likely future failures, it is put onto the blacklist. Once a node joins the blacklist, a probationary period of some specified time may be implemented before it can be removed from the blacklist. Throughout the probationary period, the current health status 111 and the predicted health status 126 of the node both have to satisfy some specified criteria. If either health status fails to satisfy the criteria, the probationary period may be reset, that is, the node has to remain on the blacklist for at least another probationary period.

Distinguishing between persistent and transient node failures may be aided by the use of the blacklist. When a node failure happens, if the node is not on the blacklist, it may indicate that the failure is transient and the node may become healthy again within an acceptable timeframe. If the failed node is on the blacklist, it may indicate that the failure is persistent and the node may not recover anytime soon. In database services, preparing one or more backup nodes to fully replace a failed node may be an expensive operation. It may involve, among other things, transferring all the data that used to be hosted by the failed node onto the backup node(s). Thus it may be desirable to avoid this operation as much as possible. For transient node failures, the database cluster may temporarily work around the failed node without fully evicting it. Then when the failed node becomes healthy again, it can rejoin the cluster. For persistent node failures, one or more backup nodes may have to be called upon to take the place of the failed node to maintain database redundancy.

Thus, the type of node failure may be used to determine which actions are to be taken in response. When transient failures occur, user requests are temporarily redirected to other nodes hosting the same data portions as the failed node, and a grace period may be granted for the node to recover. Only if the node does not recover within the grace period, one or more backup nodes may be called upon to replace it. When persistent failures occur, it is pointless to wait for the node to recover, so one or more backup nodes may be called upon immediately.

Figure 4:
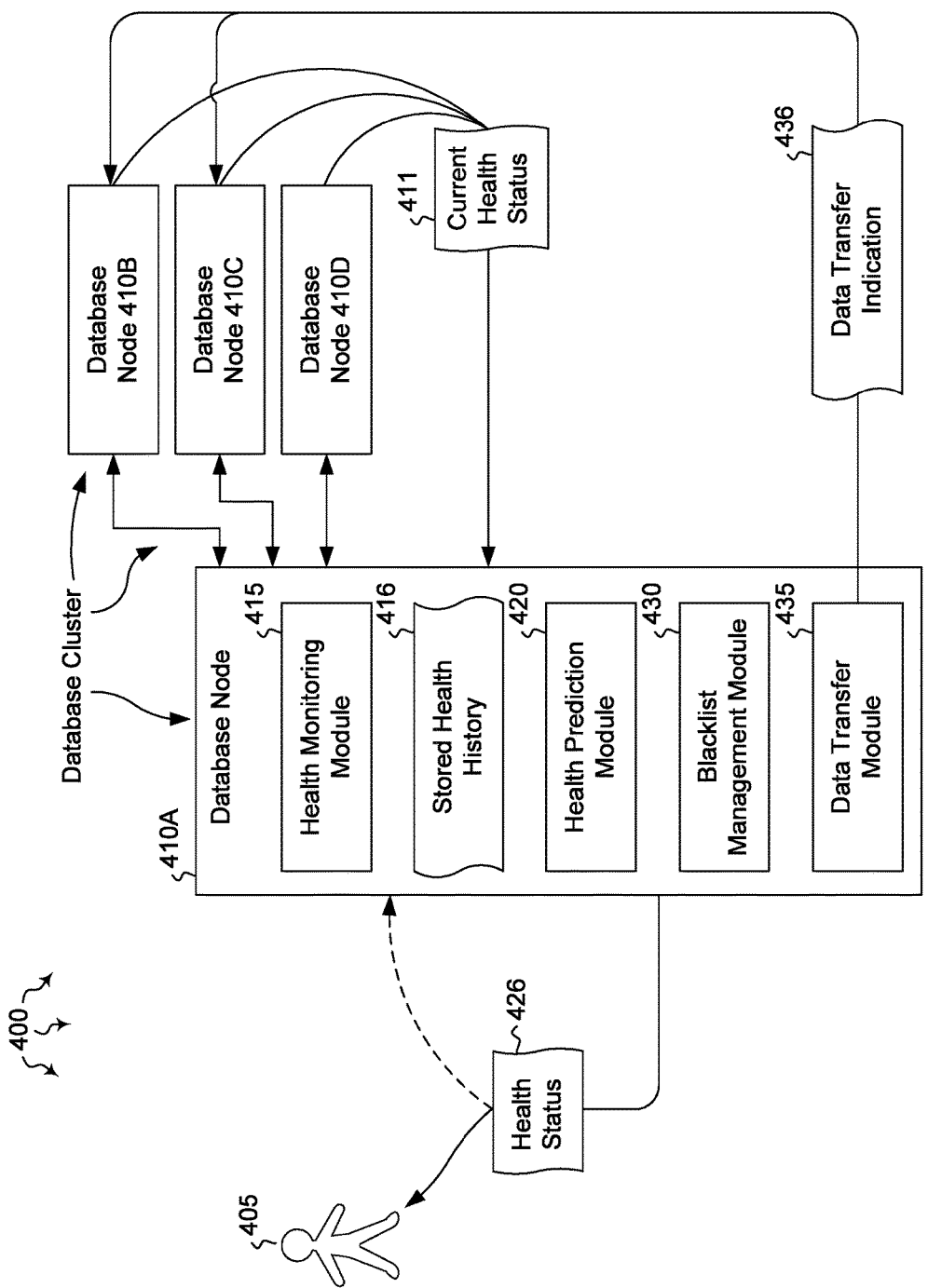
FIG. 4 illustrates an embodiment of the present invention in which potential failures are proactively handled.

Blacklist membership itself can also be a precursor or indicator of future failures. For instance, a node may appear usable at the moment it is being blacklisted. This may occur due to environmental issues, such as hard drive bad sectors. Such errors may take a while before affecting software running on that node. However, by proactively transferring data away from the node, the database management service may reduce the impact of future errors. Moreover, by not transferring new data to the node, the failure may be contained. These concepts will be illustrated below with regard to FIGS. 3 and 4.

FIG. 3 illustrates a flowchart of a method 300 for proactively handling failures in database services. The method 300 will now be described with frequent reference to the components and data of environment 400.

Method 300 includes an act of monitoring one or more health indicators for a plurality of nodes in a database cluster (act 310). For example, health monitoring module 415 may monitor health indicators for any one or more of database nodes 410A, 410B, 410C and 410D. As explained above, the health monitoring may include identifying and logging the occurrence of hardware errors, software errors, processing load or any other indicators of a computer node's health. The current health status 411 reported by the monitored nodes may be stored in health history 416. The current health status and health history may be accessed by the health prediction module 420 (act 320). Using the current health status (i.e. the monitored health indicators) and the stored health history, module 420 may generate a health status that indicates the likelihood that the monitored nodes will be healthy within a specified future time period (act 330).

For example, database node 410D may have experienced multiple errors over a period of time. These errors are monitored and logged. If the errors are serious enough, or if the frequency of occurrence is high enough, the node will be predicted to be unhealthy in the near future.

Method 300 also includes an act of determining, for at least one of the monitored nodes, that the likelihood that node will be healthy is below a threshold level (act 340). Based on the determination, the node may be blacklisted, and a blacklist manager may update the membership of the blacklist. For example, blacklist management module 430 may determine for database node 410D that the node has a low likelihood of being healthy in the future. This determination may be based on the current health status, or on error patterns determined from the stored health history 416, or from both.

Method 300 includes an act of transferring one or more portions of data stored on the monitored node to one or more other nodes in the database cluster (act 350) and an act of preventing the monitored node from storing new data (act 360). For example, based on the determination made by the blacklist management module 430, the data on node 410D may be transferred to any of nodes 410A, 410B and 410C. Node 410D may be blacklisted and prevented from storing new data.

Node 410D may appear either usable or unusable when it is blacklisted. The states may be referred to as "Up and Blacklisted" and "Down and Blacklisted" respectively. In cases where the node is down and blacklisted, one or more backup nodes may be called upon immediately and data transfer module 435 may indicate to other nodes in the cluster hosting the same data portions as node 410D, that the data stored on node 410D is to be transferred to the backup node(s). In cases where the node is up and blacklisted, it may continue to provide access to the data already stored on it, while its data is being transferred to the backup node(s) (e.g. as part of a background process). However, no new data is allowed to be stored on the node.

The current blacklist, as well as the current health status for each node may be provided to the user 405 in health status report 426. Using this report, the user may make efficient database management decisions, and may proactively handle errors on the various database nodes as a supplement to the automated responses.

Accordingly, methods, systems and computer program products are provided which predict the health of a computer node using health report data. Moreover, methods, systems and computer program products are provided which proactively handle failures in database services.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for predicting the health of a plurality of nodes by using health report data, the computer system comprising one or more processors executing computer executable instructions which cause the computer system to perform the following:
    monitors one or more health indicators for a plurality of nodes;
    accesses one or more stored health indicators that provide a health history for one or more of the monitored plurality of nodes;
    based on both the monitored health indicators and the stored health history, predicts a health status, wherein the predicted health status indicates for at least one of the monitored plurality of nodes that the at least one monitored node will be healthy or unhealthy in the future; and
    presents the predicted health status to a specified entity.

2. The computer system of claim 1, wherein the monitored nodes are nodes of a data processing system, and wherein the predicted health status comprises a determination that there is a probability that the at least one monitored node will be healthy, and wherein the determination is below a threshold level; and
    transfers one or more portions of data stored on the at least one monitored node to one or more other nodes of the data processing system.

3. The computer system of claim 2, wherein the computer system further performs the following:
    prevents the at least one monitored node from storing new data.

4. The computer system of claim 2, wherein making the determination that the probability that the at least one monitored node will be healthy, and wherein the determination is below a threshold level, comprises determining that the at least one monitored node is in a critical state.

5. The computer system of claim 2, wherein making the determination that the probability that the at least one monitored node will be healthy, and wherein the determination is below a threshold level, comprises determining that the at least one monitored node has experienced one or more failures within a specified time period.

6. The computer system of claim 5, wherein the computer system further performs the following:
assigns an error level to each of the failures.

7. The computer system of claim 6, wherein the computer system further performs the following:
determines that a threshold number of the failures are beyond a specified error level, such that the at least one monitored node is blacklisted.

8. The computer system of claim 7, wherein any monitored node that has a threshold number of failures beyond a specified error level are blacklisted, regardless of a monitored node's health history.

9. The computer system of claim 7, wherein blacklisted nodes are put on probation for a specified amount of time to determine whether errors occur during probation.

10. The computer system of claim 9, wherein the computer system further performs the following:
upon determining for a monitored node that was blacklisted that the probationary period is complete and that no further errors have occurred, allowing the monitored node that was blacklisted to continue storing new data and removing the monitored node from the blacklist.

11. The computer system of claim 9, wherein the computer system further performs the following:
upon determining for a monitored node that was blacklisted that the probationary period is complete and that one or more further errors have occurred, preventing the monitored node that was blacklisted from storing new data.

12. The computer system of claim 11, wherein the computer system further performs the following:
relocates data portions that are hosted on the monitored node that is prevented from storing new data.

13. The computer system of claim 1, wherein the predicted health status indicates for at least one of the monitored plurality of nodes that there is a probability that the at least one monitored node will be healthy in the future.

14. The computer system of claim 1, wherein the predicted health status indicates for at least one of the monitored plurality of nodes that there is a probability that at least one monitored node will be healthy within a specified future time period.

15. The computer system of claim 1, wherein the predicted health status indicates for at least one of the monitored plurality of nodes that there is a probability that at least one monitored node will be unhealthy in the future.

16. A computer-implemented method for proactively handling failures in a distributed processing system comprising a plurality of nodes, the computer-implemented method being performed by one or more processors executing computer executable instructions for the computer-implemented method, and the computer-implemented method comprising:
monitoring one or more health indicators for a plurality of nodes of a distributed processing system;
accessing one or more stored health indicators that provide a health history for the one or more of the monitored nodes of the distributed processing system;
predicting a health status based on the monitored health indicators and the health history, wherein the predicted health status indicates that at least one of the one or more monitored nodes of the distributed processing system will be healthy or unhealthy in the future;
determining, for at least one of the monitored nodes of the distributed processing system, that a threshold number of failures have occurred that are beyond a specified error level;
based on the determination, blacklisting the at least one monitored node for which the determination was made;
transferring one or more portions of data stored from the at least one monitored node that is blacklisted to one or more of other nodes of the distributed processing system; and
preventing the node that was blacklisted from storing new data.

17. The computer-implemented method of claim 16, wherein the node that is blacklisted is categorized as up and blacklisted, such that the blacklisted node remains used for storing data while the data is transferred to other nodes of the distributed processing system, and no new data is stored on the node that is up and blacklisted.

18. The computer-implemented method of claim 16, wherein the node that is blacklisted is categorized as down and blacklisted, such that the blacklisted node is no longer used for storing data, and data is transferred from the blacklisted node to other nodes of the distributed processing, and no new data is stored on the node that is down and blacklisted.

19. The computer-implemented method of claim 18, wherein the data is transferred without waiting for a probationary period.

20. The computer-implemented method of claim 16, wherein the predicted health status indicates for at least one of the monitored plurality of nodes that there is a probability that the at least one monitored node will be healthy in the future.

21. The computer-implemented method of claim 16, wherein the predicted health status indicates for at least one of the monitored plurality of nodes that there is a probability that the at least one monitored node will be healthy within a specified future time period.

22. The computer-implemented method of claim 16, wherein the predicted health status indicates for at least one of the monitored plurality of nodes that there is a probability that the at least one monitored node will be unhealthy in the future.

23. A system comprising:
a processing system comprised of a plurality of nodes;
one or more computer-readable storage hardware media, excluding transmission media, having stored thereon computer-executable instructions that, when executed by one or more processors, cause the system to be configured with an architecture that proactively handles failures in the plurality of nodes by using health indicators, and wherein the architecture is configured to perform the following:
monitor one or more health indicators for a plurality of nodes of a processing system;
access one or more stored health indicators that provide a health history for one or more of the monitored plurality of nodes;

based on both the monitored health indicators and the stored health history, predict a health status, wherein the predicted health status indicates for at least one of the monitored plurality of nodes that the at least one monitored node will be healthy or unhealthy in the future; and present the predicted health status to a specified entity.

24. The system of claim 23, wherein the architecture is further configured to blacklist at least one of the monitored nodes upon determining that a threshold number of failures have occurred that are beyond a specified error level.

25. The system of claim 24, wherein the architecture is further configured to transfer one or more portions of data stored on the monitored node that is blacklisted to one or more other nodes of the processing system.

26. The system of claim 25, wherein the node that is blacklisted is categorized as up and blacklisted, such that the categorized node remains used for storing data while the data is transferred to other nodes of the processing systems, and no new data is stored on the node that is up and blacklisted.

27. The system of claim 23, wherein the predicted health status indicates for at least one of the monitored plurality of nodes that there is a probability that the at least one monitored node will be healthy in the future.

28. The system of claim 23, wherein the predicted health status indicates for at least one of the monitored plurality of nodes that there is a probability that the at least one monitored node will be healthy within a specified future time period.

29. The system of claim 23, wherein the predicted health status indicates for at least one of the monitored plurality of nodes that there is a probability that the at least one monitored node will be unhealthy in the future.

* * * * *